United States Patent Office 2,883,009
Patented Apr. 21, 1959

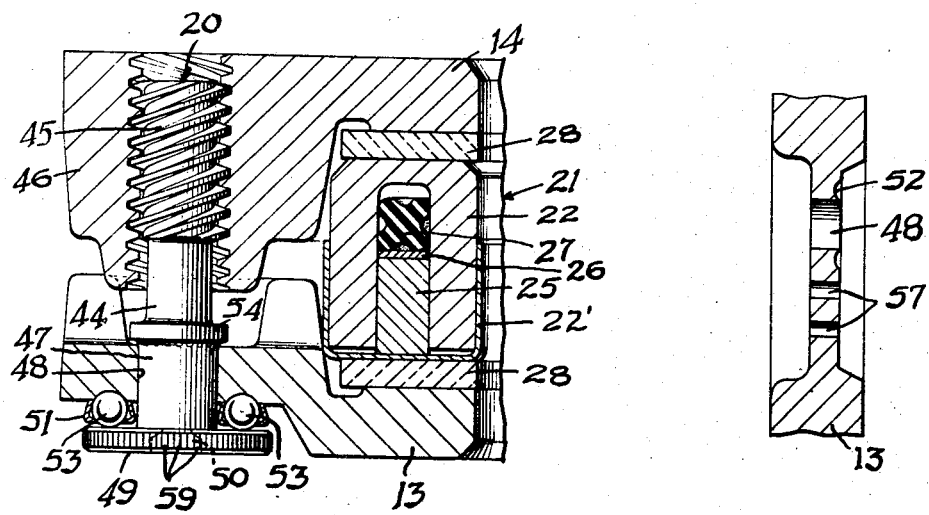
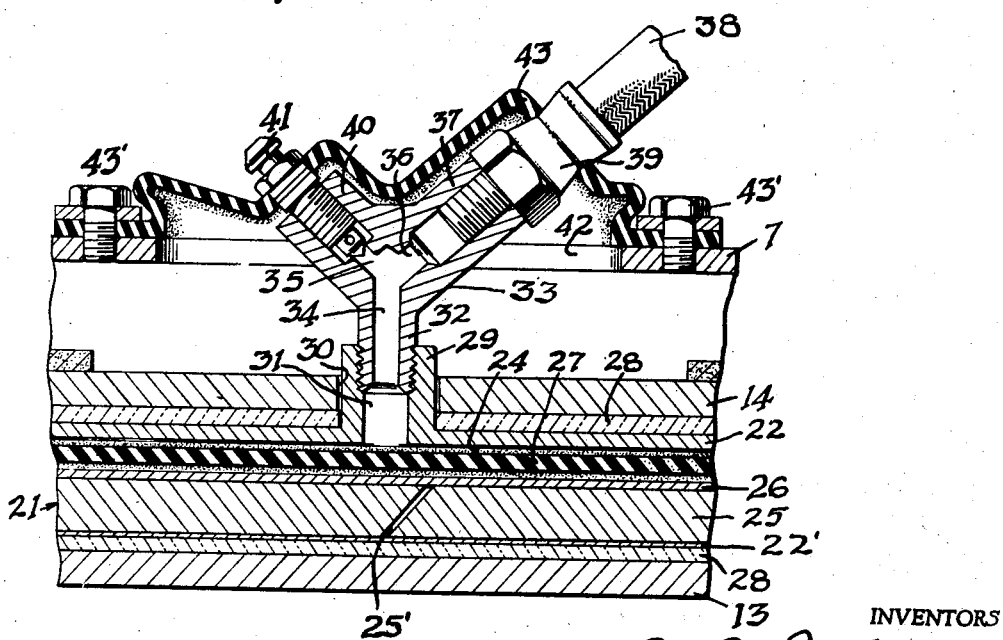

2,883,009
FLUID PRESSURE-OPERATED SELF-ADJUSTING DISC BRAKE

Albert D. Ishoy, Hartford, and James W. Tiscornia, St. Joseph, Mich., assignors, by mesne assignments, to Lambert Brake Corporation, St. Joseph, Mich., a corporation of Michigan Original application October 17, 1955, Serial No. 540,939. Divided and this application April 22, 1957, Serial No. 654,245

8 Claims. (Cl. 188—72)

This application is a division of application Serial Number 540,939, filed October 17, 1955.

The present invention relates to disc brakes, and more particularly to a disc brake having novel and improved fluid pressure-operated actuator means to effect engagement of the brake and automatic or self-adjuster means operative responsive to the action of the actuator means on the brake to effect progressive automatic adjustment of the brake, thus maintaining a constant or uniform release clearance between the discs and the member to be braked.

Previously, very powerful, efficient and durable disc brakes have been provided which included means for automatically compensating for wear of the brake lining materials therein contained, such brakes generally being of such a construction that they became self-energized upon brake application. However, for some applications, self-energization of such disc brakes may be unnecessary, particularly in such cases as when the operating pressure of the brake actuator means is sufficient to fully apply the brake with adequate power to satisfy braking requirements.

Accordingly, an object of the invention is to provide a disc brake which is powerful in its brake action and which derives its actuation from a fluid pressure-operated actuator, without further actuation as by means such as self-energizing means previously utilized to implement brake operation.

Another object is to provide a disc brake having a novel and improved fluid pressure-operated actuator device including an annular actuator member adapted to be disposed between a pair of discs and having an annular piston chamber therein, and an annular piston reciprocatably mounted in the piston chamber for axial movement responsive to the admission and release of fluid pressure in the piston chamber. In accordance with this objective, the piston is preferably in the form of a split ring adapted to compensate for expansion and contraction caused by variations in the temperature of the actuator parts. In conjunction with this piston, there is also provided an annular seal, preferably in the form of a "Quad-ring" seal, and between the seal and the piston, there is disposed a back-up washer or ring which prevents the seal from becoming extruded and interfering with the operation of the piston. The incorporation of the back-up washer in the piston chamber between the seal and the piston is an important improvement in the actuator device, since it permits the piston to be a non-precision part which need not be accurately machined. In previous actuator devices of the same general type as that herein disclosed, it was necessary to accurately machine three surfaces of the actuator piston, whereas the present piston need not be precision machined at all, but may be utilized with mill tolerance. Moreover, further advantage accrues from the use of a split annular piston by virtue of the ability of the piston to expand or contract to allow for tolerance in the formation of the annular piston chamber.

Accordingly, in accordance with the preceding objective, a further object is to provide a fluid pressure-operated actuator device which is easy to manufacture and maintain, and which requires a minimum of precision made parts, thus accomplishing substantial savings in the time and cost required for manufacture and assembly, but without sacrifice of the efficiency or life of the actuator.

A further object is to provide a disc brake having novel and improved automatic or self-adjuster means for maintaining a constant release clearance for the brake throughout the life of the brake friction linings with which they are usually equipped. Heretofore, automatic or self-adjusters have been utilized in disc brakes of the type previously referred to, such adjusters including a one-way shiftable member mounted in a specially formed support on one disc and engageable at its opposite ends with specially formed abutments on another disc. The adjuster of the present invention is materially simplified however, in that the one-way shiftable member in the instant adjuster is carried by the body of the discs themselves, rather than by a specially formed support, and no special abutments are required.

Still another object is to provide a brake assembly, including a rotatable housing to be braked having opposed radially extended and axially spaced friction surfaces therein, an inner double-disc assembly concentrically disposed in the housing and shiftably mounted upon a fixed support for axial shifting movements of the discs of the double-disc assembly, the discs having therebetween the improved fluid pressure-operated actuator device previously referred to, and the discs also having associated therewith the improved automatic or self-adjuster means previously referred to.

Other objects and advantages of the invention will hereinafter be described or will become apparent to those skilled in the art, and the novel features thereof will be defined in the appended claims.

In the drawings:

Fig. 3 is an enlarged view in section, as taken on the line 3—3 of Fig. 1, showing the details of construction of the improved fluid pressure-operated actuator device and the improved automatic adjuster;

Fig. 4 is an enlarged fragmentary view in section, as taken on the line 4—4 of Fig. 1, showing the portion of one of the discs which is adapted to receive the automatic adjuster; and Fig. 5 is an enlarged fragmentary view in section, as taken on the line 5—5 of Fig. 2, further showing the details of construction of the improved fluid pressure-operated actuator device of the invention.

Like reference characters in the several figures of the drawings and in the following description designate corresponding parts.

Figure 1:
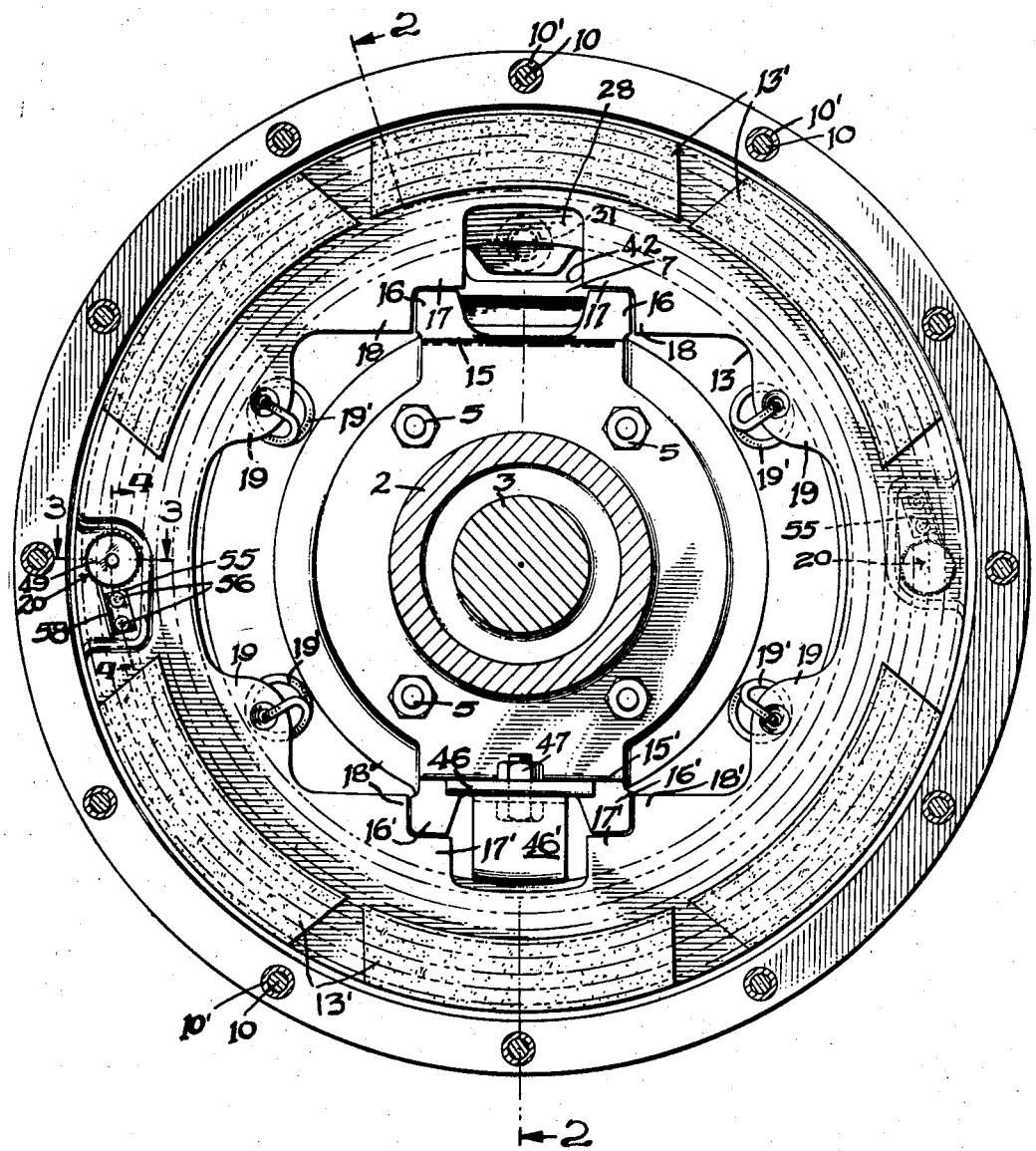
Fig. 1 is a view in side elevation of a brake embodying the present invention, with the outboard side of the brake housing removed to disclose the interior construction, this view representing a section as taken on the line 1—1 of Fig. 2.

The brake illustrated in the drawings represents a front brake for a motor vehicle, adapted to be associated with a vehicle wheel 1 which is mounted on a wheel-mounting hub 2, by means of a suitable number of screw fasteners 2', the hub 2 being journalled on a spindle 3 of the front wheel-supporting assembly 4. Adapted to be connected to the wheel-supporting structure 4, as by means of a plurality of fasteners 5 extending through a flange 6 of the supporting structure 4, is a stationary backing plate or adapter 7.

Secured to the wheel-mounting hub 2 by the screws 2' is a hollow, two-part rotatable brake housing having an outboard section 8 and an inboard section 9 secured together as by means of a suitable number of screws 10 which threadedly engage in a like number of nuts 10' which are recessed in the inboard section 9 of the housing. Interiorly thereof, the housing sections 8 and 9 are respectively provided with opposed, radially extended friction surfaces 11 and 12 which are adapted to be engaged by a pair of brake discs 13 and 14 which are disposed within the housing and constitute an inner double-disc assembly.

The backing plate 7 is provided with a generally axially extended supporting lug 15 at the upper side thereof which is preferably formed with a pair of bearing projections 16, 16, and the discs 13 and 14 are each preferably provided on their inner peripheries with a pair of bearing projections 17, 17 slidably supported upon the projections 16, 16 on the supporting lug 15. Adjacent to each of the bearing projections 17 on the discs 13 and 14, they are each provided with a pair of opposed anchor lugs 18, 18 which engage the opposite sides of the supporting lug 15 to prevent rotative movements of the discs, while allowing the discs to shift axially on the supporting lug 15. In diametrically opposed relation to the supporting lug 15, the backing plate 7 is also provided with a second supporting lug 15', the latter lug also having bearing portions 16', 16'. The discs 13 and 14, accordingly, are also each provided with a pair of bearing projections 17', 17' and a pair of anchor lugs 18', 18' for supporting and anchoring engagement with the supporting lug 15'.

Thus the outboard disc 13 and the inboard disc 14 are both mounted upon the supporting lugs 15, 15' for axial shifting movements by the cooperative bearing portions 16, 17 and 16', 17', while said discs are held against rotative movement with relation to the supporting lugs 15, 15' on the backing plate 7 by engagement of the anchor lugs 18, 18' of each disc with the respective bearing projections 16 and 16'. For the purpose of clearly illustrating the foregoing, the respective bearing and anchor projections or lugs just described are shown in Fig. 1 with a slight gap therebetween, but in practice, it will be understood that these parts will be relatively closely fitted with one another so as to preclude free radial movement of the inner disc assembly upon the supporting lugs 15 and 15'.

At a suitable number of points about the inner periphery of each of the discs 13 and 14, they are provided with inwardly projecting marginal ears 19 to which are connected the opposite ends of coiled tension springs 19' which normally urge the discs 13 and 14 towards one another and out of engagement with the friction surfaces 11 and 12 in the housing 8. Movement of the discs axially towards one another is limited by adjuster means generally designated 20 which will hereinafter be more fully described.

It will be recognized that the housing sections 8 and 9 and the discs 13 and 14 together constitute a plurality of brake members which are disposed in side-by-side relationship, and that certain of these parts are shiftable into engagement with other of these parts to effect brake engagement. In the illustrative embodiment, the housing sections 8 and 9 are fixed against axial movement, but the discs 13 and 14 are shiftable axially away from one another and into engagement with the respective housing sections responsive to operation of a fluid pressure-operated actuator device generally designated 21 which will now be described in detail.

The actuator device 21 includes an annular member 22 which, for the purposes of this description, will be referred to as an actuator cylinder of generally annular form and rectangular cross-section having in one lateral side thereof an annular piston chamber 24 in which is reciprocably disposed an annular piston 25, with the member 22 disposed adjacent to the disc 14, and the piston 25 projecting from the piston chamber towards the outboard disc 13. Disposed directly behind the piston 25 in the piston chamber 24 is a relatively thin, flat, annular back-up washer 26 which is preferably composed of spring steel to permit deflection without permanent distortion, and behind the back-up washer 26 is disposed an annular resilient seal 27 of any desired cross-sectional form, but preferably of the form best seen in Fig. 3 and commonly referred to as a "Quad-ring" seal having a central core and a plurality, namely, four, equidistantly circumferentially spaced sealing fins projecting radially therefrom. Preferably, an annular shield 22' of U-shaped cross-section is shiftably mounted on the member 22 at the side of the latter from which the piston 25 projects, this shield closely fitting the inner and outer peripheries of the member 22 and overlying the outer end of the piston 25. Thus, the entry of foreign material, such as lining dust, dirt, water and the like, into actuator 21 is effectively precluded. Furthermore, the piston 25 is preferably split transversely at at least one point as is clearly illustrated in Fig. 5, wherein there is shown a gap 25' between opposed angularly extended end faces of the piston 25. Such a split piston construction materially reduces the need for precision manufacture of the piston by allowing expansion or contraction of the piston.

Interposed between the member 22 and the inboard disc 14 and between the shield 22' and the outboard disc 13, there is preferably disposed a pair of insulating rings 28, 28, whereby during brake application, the transmission of heat from the disc 13 and 14 to the actuator device 21 is prevented, these insulating rings 28 being preferably fabricated of a material having a high content of asbestos or other insulating substance.

For admitting fluid under pressure to the piston chamber 24, the annular actuator member 22 is provided with a hollow neck 29 which projects rearwardly from the rear wall thereof through an opening 30 in a depression in the inboard disc 14. This neck 29 is provided with a passage 31 communicating with the piston chamber 24, and interiorly of the neck 29, it is screw threaded for engagement with complemental threads on a stem 32 of a fitting generally designated 33, this fitting having an inlet-outlet passage 34 communicating with the passage 31 in neck 29 and also having a pair of passages 35 and 36 communicating with the passage 34. The passage 36 extends through an arm 37 of the fitting 33, and this arm is adapted to receive an end of a fluid conduit 38 which is coupled to the arm 37 in any suitable manner as at 39, whereby fluid under pressure may be supplied to the actuator 21. The passage 35 extends through an arm 40 of the fitting 33 and is adapted to receive a conventional bleeder valve assembly generally designated 41. The fitting 33 extends through an opening 42 in the backing or adapter plate 7, and a resilient dust seal 43 of rubber or other suitable material is secured to the backing plate 7 as by means of a suitable number of screws 43', and is sealingly engaged about the bleeder valve assembly 41 and the fluid conduit 38, so as to preclude the entry of foreign matter into the brake housing.

The annular actuator device 21 is substantially freely mounted and floats between the discs 13 and 14, and the discs 13 and 14 are each provided with generally axially extended flanges 13" and 14", respectively, forming a means for supporting and restraining the actuator 21 against displacement from its concentric relation to the disc assembly as a whole. Preferably, the flanges 13" and 14" constitute the radially inmost fins of a plurality of annular fins formed on the inboard face of the outboard disc 13 and the outboard face of the inboard disc 14 for purposes of adding strength with a minimum of weight, these fins or ribs being clearly seen in Fig. 2. The insulating rings 28, 28 are also preferably freely mounted between the actuator cylinder and the respective discs. It should be understood, however, that when the brake is installed on a motor vehicle wheel, the fluid conduit 38 and the piston chamber 24 are filled with brake fluid which is maintained under pressure, as produced by a conventional master cylinder (not shown) with which such vehicles are usually equipped, this pressure being incapable of causing axial separation of the discs, but being sufficient to maintain a snug relationship between the discs 13 and 14, the insulating rings 28, 28 and the actuator device 21, due to the expansive force of the piston 25 and the annular member 22 as caused by such internal pressure.

Figure 2:
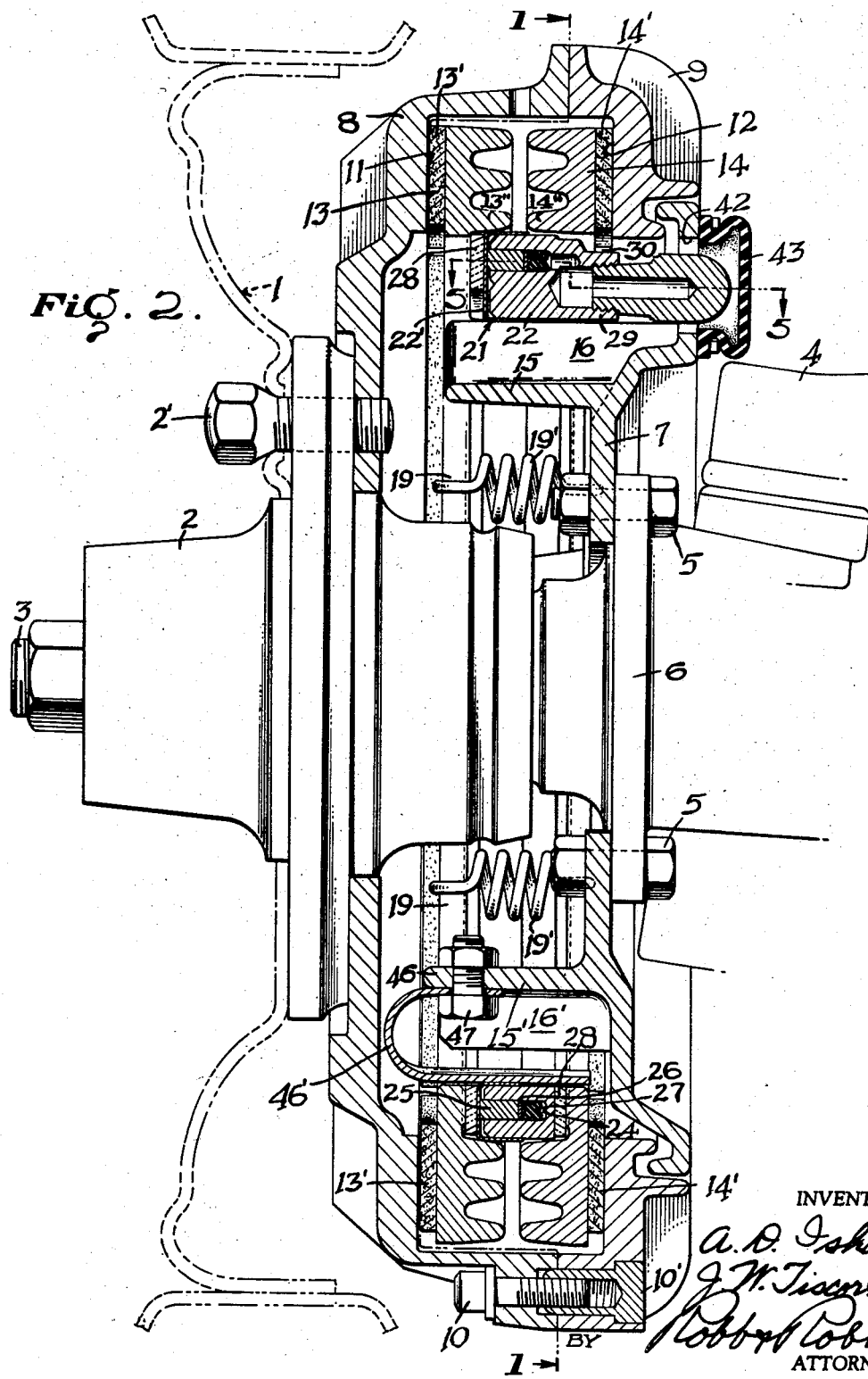
Fig. 2 is a slightly enlarged view in section, as taken on the line 2—2 of Fig. 1, with certain of the parts shown in elevation.

However, while such residual line pressure maintains a vibration-free relationship between the annular actuator device 21, the insulating rings 28, 28 and the discs 13 and 14, and while the actuator device 21, as a whole, is carried by the two discs, nevertheless the inner double-disc assembly would ordinarily be capable of slight vibration due to road shock during movement of the vehicle. Such vibration would be ordinarily permitted by virtue of manufacturing tolerances between the discs 13 and 14 and the lugs 15 and 15'. In order to avoid such vibration, with resultant elimination of objectionable noise or rattle, means is preferably provided for biasing the inner double-disc assembly into snug contact with the supporting lug 15 on the backing plate 7. For this purpose, the supporting lug 15' on the backing plate 7 is provided with an axially extended lip 46 to which is secured by means of a screw 47 or the like a generally U-shaped leaf spring 46' having one side or arm thereof connected by the fastener 47 to the lip 46, while the other side or arm extends across the inner double-disc assembly and bears downwardly upon the inner margin of the double-disc assembly, as best seen in Fig. 2, to urge the entire double-disc assembly downwardly, whereby the supporting lugs 17 on the discs 13 and 14 at the upper side of the assembly are maintained in close contact with the supporting projections 16 on the lug 15, and vibratory movements of the disc assembly are effectively precluded.

When the brake is to be applied, fluid under pressure will be transmitted through the conduit 38 to the actuator 21 by any suitable means, such as by a conventional foot-pedal-operated master cylinder (not shown), and the actuator 21 will expand to shift the discs axially apart and into braking engagement with the friction surfaces 11 and 12 in the housing. Engagement of the anchor lugs 18 and 18' on the discs 13 and 14 with the projections 16 and 16' on the supporting lugs 15 and 15' will preclude rotative movement of the discs upon brake application and absorb torque imparted to the discs from the housing 8.

The discs 13 and 14, as is usual, are preferably provided with friction lining material segments 13' and 14', respectively, and after repeated braking operations, this friction lining material will begin to wear down. Therefore, the brake is preferably provided with means for automatically adjusting the discs 13 and 14 to maintain a minimum predetermined release clearance between the discs and the friction surfaces of the housing, so that brake actuating movements of the discs and the operating pedal aforementioned will be maintained at a minimum. In accordance with the objectives of the invention, this adjuster means is preferably constructed as is best seen in Fig. 3 of the drawings.

Referring now to Fig. 3, the adjuster 20, which is preferably duplicated at a diametrically opposite position, as shown in Fig. 1, comprises a one-way shiftable member 44 in the form of an axially extended member having a screw-threaded stem 45 adapted to be threadedly supported in a complementally threaded opening extending through an enlarged screw-supporting lug 46 formed adjacent the outer periphery of the inboard disc 14. The adjuster or screw member 44 has a cylindrical end portion 47 which projects axially through an opening 48 through the portion of the outboard disc 13 which is disposed in opposed relation to the supporting lug 46. Suitably secured to the outer extremity of the cylindrical end 47 of the screw member 44 is a circular head 49, this head 49 preferably being secured in position on the adjuster member 44 as by peening over an axially extended projection 50 on the screw member 44. Interposed between the head 49 and the opposing portion of the outboard disc 13 is an annular ball bearing assembly 51, and the disc 13 is preferably provided with an annular depression 52 in which the balls 53 of the bearing assembly 51 seat. At the opposite side of the disc 13 from the adjuster head 49, the screw member 44 is provided with an annular enlarged shoulder 54 which is adapted to engage the inboard side of the disc 13 to limit movement of the discs towards one another, depending upon the position of the screw member 44 as is determined by the threads on the threaded stem 45 and in the supporting lug 46 on disc 14. In practice, the disc 13 will be allowed to have a slight amount of free play upon the cylindrical end portion 47 of the screw member 44 so as to provide for release clearance of the brake, as will hereinafter more fully appear.

The foregoing description of the automatic adjuster specifically shown in Fig. 3 relates to the adjuster shown at the left-hand side of the brake of Fig. 1, and preferably at a diametrically opposed position, the discs 13 and 14 are provided with a similar adjuster 20. However, in order to allow the discs to be identical in form, thus requiring that only a single form of disc be made, and that two of such discs may be turned back-to-back to provide a double-disc assembly, the adjuster supporting lug 46 of the adjuster at the righthand side of the brake in Fig. 1 will be disposed on the outboard disc 13, while the cylindrical portion 47 of the adjuster member 44 will project through an opening 48 in the inboard disc 14. In other words, the parts in the adjuster at the righthand side of the brake of Fig. 1 are reversed from the relationship of such parts of the lefthand adjuster shown in Fig. 1.

Each adjuster 20 is provided with means for limiting rotation of the screw member 44 and consequent axial movement thereof in one direction only. As is best seen in conjunction with the lefthand adjuster of the brake of Fig. 1, such means is preferably in the form of a spring 55 which is secured to the outboard disc 13 as by means of a pair of rivets, screws or the like, as at 56, 56, which project through a pair of spaced openings 57, 57 formed in the disc 13, as is best seen upon reference to Fig. 4. The spring 55 includes an arm 58 which projects angularly into engagement with the outer periphery of the head 49 which is preferably provided with a plurality of circumferentially spaced teeth or serrations 59 for engagement by the end of the spring arm 58.

In operation, fluid under pressure is supplied through conduit 38 and through fitting 33 to the annular piston chamber 24, thus urging the piston 25 outwardly of the piston chamber in the annular member 22 to effect axial separation or spreading of the discs 13 and 14 into frictional contact with the rotatable housing 8. Upon release of such operating pressure, the discs will move axially towards one another until the discs engage the shoulders 54 on the respective screw members 44 which limit movement of the discs towards one another to only a slight amount required for release clearance of the brake, so that the housing will rotate freely without engagement by the discs when the brake is released. As the friction lining segments 13' and 14' wear down, further separation of the discs, as required to effect engagement of the brake, will cause a force to be exerted on the screw members 44 which, in effect, will cause each adjuster member 44 to be pulled axially out of the threaded opening in its supporting lug 46 by pressure of the discs under the heads of the screw member 44 of each adjuster assembly 20. The screw threads on the adjuster screws 44 and in the openings in which they are mounted are so formed that the screws 44 are easily caused to rotate responsive to axial pressure under the heads 49. Frictional resistance to rotation of the adjuster screws responsive to brake application is maintained at a minimum by the utilization of the ball bearing assembly 51 with the adjusters 20. Subsequent to each adjustment by the adjusters 20, when the brake is released, the movement of the discs 13 and 14 towards one another is limited by the shoulders 54 on the screw members 44, and rotation of the screw members 44 in a direction which would negative the adjustment is effectively precluded by the spring arm 58 which is engaged in one of the teeth or serrations on the head 49 of the respective screw members 44.

It will be understood from the foregoing that the fluid pressure-operated brake hereinbefore described attains all of the objects stated at the commencement hereof, as well as other objects and advantages which will be recognized by those skilled in the art.

While the specific details of the invention have been herein shown and described, changes and alterations may be resorted to without departing from the spirit thereof as defined in the appended claims.

We claim:

1. A self-adjusting actuator disc assembly for a friction device, comprising a pair of axially shiftable actuator discs disposed in side-by-side relation and adapted to be supported for axial movement of one disc relative to the other, and self-adjuster means for limiting relative movement of one disc towards the other while permitting relative movement of one disc away from the other, said self-adjuster means including a one-way shiftable adjuster member shiftably supported in one disc and projecting to the opposite side of the other disc, means on said adjuster member engaged with the latter disc for shifting the adjuster member upon axial movement of one disc relative to the other, and means also on said adjuster member for limiting relative movement of one disc towards the other.

2. A self-adjusting actuator disc assembly as defined in claim 1, wherein said adjuster member is screw-threaded at one end, and the disc on which the adjuster member is supported having a complementally screw-threaded opening in which the threaded end of the adjuster member is disposed.

3. A self-adjusting actuator disc assembly as defined in claim 1, wherein said adjuster member is screw-threaded at one end, and the disc on which the adjuster member is supported having a complementally screw-threaded opening in which the threaded end of the adjuster member is disposed, the means aforesaid for shifting said adjuster member including an enlarged head on the other end of the adjuster member, said head being rotatably engaged with said opposite side of the other disc.

4. A self-adjusting actuator disc assembly as defined in claim 1, wherein said adjuster member is screw-threaded at one end, and the disc on which the adjuster member is supported having a complementally screw-threaded opening in which the threaded end of the adjuster member is disposed, the other disc having an opening therethrough, with the other end of the adjuster member freely projecting through said opening and having an enlarged head at the opposite side of said other disc, and anti-friction means disposed about said adjuster member between said head and said other disc.

5. A self-adjusting actuator disc assembly as defined in claim 1, wherein the means for limiting relative movement of one disc towards the other includes an abutment on said adjuster member engageable with one of said discs.

6. A self-adjusting actuator disc assembly as defined in claim 1, wherein said adjuster member and the disc on which it is supported are complementally screw-threaded, and one of said discs having means thereon engageable with said adjuster member to prevent rotation of the adjuster member in one direction.

7. A self-adjusting actuator disc assembly as defined in claim 1, wherein said adjuster member and the disc on which it is supported are complementally screw-threaded, said adjuster member having an enlarged head engageable with the other disc, said head having a plurality of teeth spaced about its outer periphery, and a spring dog engageable with said teeth for preventing rotation of the adjuster member in one direction.

8. A self-adjusting actuator disc assembly for a friction device, comprising a pair of actuator discs disposed in side-by-side relation and adapted to be supported for axial movement of one disc relative to the other, said discs each being provided with an opening, said openings being disposed in axial alignment with one another, one of said openings being screw-threaded, a one-way shiftable adjuster member, said adjuster member being longitudinally extended axially of the discs and having one end screw-threaded and mounted in said threaded opening, the other end of said adjuster member extending through the opening in the other disc and being freely rotatable therein, a stop abutment on the adjuster member between the discs to limit movement of one disc towards the other, said adjuster member having an enlarged head on its last-mentioned end engageable with the side of the latter disc opposite said abutment to effect threaded movement of the adjuster member in one direction responsive to relative movement of one disc away from the other, and means engageable with the adjuster member for limiting threaded movement of the adjuster member in the opposite direction.

References Cited in the file of this patent

UNITED STATES PATENTS

| | | |
|---|---|---|
| 2,106,167 | Colman | Jan. 25, 1938 |
| 2,386,477 | Kraft | Oct. 9, 1945 |
| 2,563,759 | Tiscornia et al. | Aug. 7, 1951 |
| 2,762,461 | Naumann | Sept. 11, 1956 |
| 2,778,452 | Dasse | Jan. 22, 1957 |

FOREIGN PATENTS

| | | |
|---|---|---|
| 854,666 | France | Apr. 22, 1940 |
| 762,890 | Germany | Jan. 18, 1954 |

UNITED STATES PATENT OFFICE
CERTIFICATE OF CORRECTION

Patent No. 2,883,009                      April 21, 1959

Albert D. Ishoy et al.

It is hereby certified that error appears in the printed specification of the above numbered patent requiring correction and that the said Letters Patent should read as corrected below.

Column 1, line 57, and column 4, line 12, for '"Quad-ring"' , each occurrence, read -- lobed --.

Signed and sealed this 23rd day of August 1960.

(SEAL)
Attest:

KARL H. AXLINE                              ROBERT C. WATSON
Attesting Officer                           Commissioner of Patents